US008141049B2

(12) United States Patent
Kahlon

(10) Patent No.: US 8,141,049 B2
(45) Date of Patent: Mar. 20, 2012

(54) SYSTEM AND METHOD FOR SCALABLE FLOW AND CONTEXT-SENSITIVE POINTER ALIAS ANALYSIS

(75) Inventor: Vineet Kahlon, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1071 days.

(21) Appl. No.: 12/030,931

(22) Filed: Feb. 14, 2008

(65) Prior Publication Data

US 2008/0229286 A1 Sep. 18, 2008

Related U.S. Application Data

(60) Provisional application No. 60/894,731, filed on Mar. 14, 2007.

(51) Int. Cl.
G06F 9/44 (2006.01)
G06F 9/45 (2006.01)

(52) U.S. Cl. .......... 717/126; 717/131; 717/141

(58) Field of Classification Search .......... 717/126–131, 717/148–149, 141–143
See application file for complete search history.

(56) References Cited

U.S. PATENT DOCUMENTS

| | | | | |
|---|---|---|---|---|
| 5,896,537 | A * | 4/1999 | Landi et al. | 717/132 |
| 6,029,002 | A * | 2/2000 | Afifi et al. | 717/131 |
| 6,072,950 | A * | 6/2000 | Steensgaard | 717/126 |
| 6,157,935 | A * | 12/2000 | Tran et al. | 715/202 |
| 6,370,685 | B1 * | 4/2002 | Robison | 717/141 |
| 6,941,545 | B1 * | 9/2005 | Reese et al. | 717/130 |
| 7,003,507 | B2 * | 2/2006 | Tip et al. | 1/1 |
| 7,089,537 | B2 * | 8/2006 | Das et al. | 717/132 |
| 7,137,104 | B2 * | 11/2006 | Tip et al. | 717/126 |
| 7,254,808 | B2 * | 8/2007 | Trappen et al. | 717/143 |
| 7,421,680 | B2 * | 9/2008 | DeLine et al. | 717/126 |
| 7,493,602 | B2 * | 2/2009 | Jaeger et al. | 717/137 |
| 7,516,446 | B2 * | 4/2009 | Choi et al. | 717/128 |
| 7,526,755 | B2 * | 4/2009 | DeLine et al. | 717/126 |
| 7,559,054 | B2 * | 7/2009 | Chang et al. | 717/126 |
| 7,707,566 | B2 * | 4/2010 | Grover et al. | 717/148 |
| 7,823,135 | B2 * | 10/2010 | Horning et al. | 717/127 |
| 7,926,038 | B2 * | 4/2011 | Rossi et al. | 717/126 |
| 7,962,901 | B2 * | 6/2011 | McCamant et al. | 717/131 |

OTHER PUBLICATIONS

Fernandez et al, "Speculative alias analysis for executable code", IEEE PACT, pp. 1-10, 2002.*
Whaley et al, "Cloning based context sensitive pointer alias analysis using binary decision diagram", ACM PLDI, pp. 131-144, 2004.*
Kahlon, "Bootstrapping: A technique for scalable flow and context sensitive pointer alias analysis" ACM PLDI, pp. 249-259, 2008.*
Hind et al, "Interprocedural pointer alias analysis", ACM Tras. on Prog. Lang. & Sys. vol. 21, No. 4, pp. 848-894, 1999.*

(Continued)

Primary Examiner — Anil Khatri
(74) Attorney, Agent, or Firm — James Bitetto; Joseph Kolodka

(57) ABSTRACT

A system and method for pointer analysis for computer program verification includes forming a subset or cluster of pointers from pointers in a program by applying increasingly accurate alias analyses in a cascaded fashion such that each analysis works on a subset of pointers generated by a previous analysis's results. Aliases are computed for any pointer by computing aliases in the subsets in parallel instead of an entire program. For carrying out context and flow-sensitive alias analysis, function summaries are computed on small subsets in a top-down manner based on the points-to hierarchy which reduces the sizes of the summaries.

14 Claims, 5 Drawing Sheets

OTHER PUBLICATIONS

Das, et al.; Estimating the Impact of Scalable Pointer Analysis on Optimization; in SAS; 2001; 19 pages.

Emami et al..; Context-Sensitive Interprocedural Points-to Analysis in the Presence of Function Pointers: in SIGPLAN 1994; pp. 242-256.

Fahndrich, et al.; Scalable Context-Sensitive Flow Analysis Using Instantiation Constraints; in PLDI; 2000; 11 pages.

Foster, et al.; Polymorphic Versus Monomorphic Flow-Insensitive Points-To Analysis for C*; in SAS; 2000; 25 pages.

Heintze, et al.; Ultra-fast Aliasing Analysis using CLA; A Million Lines of C Code in a Second; in PLDI; 2001; pp. 254-263.

Lhotak, et al.; Scaling Java Points-To Analysis using SPARK; in CC; 2003; 16 pages.

Steensgaard; Points-To Analysis in Almost Linear Time: in POPL; 1996; pp. 32-41.

Whaley, et al.; Compositional Pointer and Escape Analysis for Java Programs; in OOPSLA; 1999; 20 pages.

Whaley, et al.; Cloning-Based Context-Sensitive Pointer Alias Analysis Using Binary Decision Diagrams; in PLDI; 2004; 14 pages.

Whaley, et al.; An Efficient Inclusion-Based Points-To Analysis for Strictly-Typed Languages; in SAS; 2002; 16 pages.

Whaley, et al.; bddbddb—BDD-Based Deductive DataBase bddbddb; in http://suif.stanford.edu/bddbddb; 2004; 1 page.

Wilson, et al.; Efficient Context-Sensitive Pointer Analysis for C Programs; PLDI; 1995; pp. 1-12.

Zhu, et al.; Context Sensitive Symbolic Pointer Analysis; IEEE Transactions on Computer-Aided Design of Integrated Circuits and Systems; vol. 24, No. 4; Apr. 2005; pp. 516-531.

Andersen; Program Analysis and Specialization for the C Programming Language; Phd. Thesis; DIKU, Denmark; 1994; 311 pages.

Berndl, et al.; Points-to Analysis using DBBs; PLDI; 2003; 12 pages.

DAS; Unification-based Pointer Analysis with Directional Assignments; PLDI; 2006; pp. 1-12.

Landi, et al.; Interprocedural Modification Side Effect Analysis With Pointer Aliasing; PLDI; 1993; pp. 56-67.

Zhu, et al.; Symbolic Pointer Analysis; ICCAD; 2002; pp. 150-157.

* cited by examiner

```
                                    bar(){
       struct S* p, q;              1b:  if(p->f > 0)
                                    2b:      r = g₂;
       foo() {                      3b:  else
           1a: g₁ = p;              4b:      r = g₁;
           2a: g₂ = q;              }
           3a: bar();               goo(){
           4a: goo();                   1c: t = r;
       }                                2c: s = g₂;
                                    }
```

May-Alias Summary Computation for
an Andersen Cluster

1: Input: Andersen Cluster: *An*, Lock Pointer, *p*, Control Location *l*, Function *f*.
2: Initialize *W* to $(l, \{p\})$.
3: repeat
4:    Remove a tuple *tup* = (*m*,*A*) from *W*. Set $A' = A$.
5:    if pointer $t \in A$ and the statement at location *m* is of the form $t = r$ where $t, r \in An$ then
6:       $A' = (A \setminus \{t\}) \cup \{r\}$
7:    end if
8:    if *m* is the entry location of function *f* add (*p*,*A*) to its summary then
9:       return
10:   else if *m* is the call return site of a function call for *g* then
11.     if the summary tuples have already been computed for all lock pointers in $A'$ for the exit location $exit_g$ of *g* then
12:       $B = \bigcup_{t \in A'} Sum(g, t, exit_g)$, where $Sum(g, t, exit_g)$ is the summary of pointer *t* with respect to $exit_g$ if *t* is written to in *g* else it is $\{t\}$
13:       Let *NewTuples* = $\{(m', B)\}$, where $m'$ is the call site of *g* corresponding to *m*
14:     else
15:       Add $(exit_g, A')$ to *W*
16:     end if
17:   else
18:     *NewTuples* = $\bigcup_{m' \in Pred} \{(m', A')\}$, where *Pred* is the set of predecessors of *m*
19:   end if
20:   for each tuple $(l, B) \in$ *NewTuples* that has not already been processed do
21:     if there exists a tuple of the form $(l, C)$ in *W* then
22:       replace $(l, C)$ by $(l, C \cup B)$
23:     else
24:       Add $(l, B)$ to *W*
25:     end if
26:   end for
27: until *W* is empty

FIG. 6

SYSTEM AND METHOD FOR SCALABLE FLOW AND CONTEXT-SENSITIVE POINTER ALIAS ANALYSIS

RELATED APPLICATION INFORMATION

This application claims priority to provisional application Ser. No. 60/894,731 filed on Mar. 14, 2007, incorporated herein by reference.

BACKGROUND

1. Technical Field

The present invention relates to computer system verification and more particularly to system and method for pointer analyses for scalable flow and context sensitive pointer aliases.

2. Description of the Related Art

Static analysis has been shown to be a viable technique for detecting potential bugs in large-scale real-life programs. However, the accuracy and scalability of most static error detection methods strongly hinges on the precision and efficiency of the underlying pointer analysis, especially for C programs. Successful static analysis techniques have been devised for detecting data race deadlocks, memory leaks and buffer overflows, among others. To be effective such static analyses must satisfy two key conflicting criteria, i.e., accuracy and scalability.

Static analysis works on heavily abstracted versions of the given program which may potentially lead to many bogus warnings. A key challenge in effectively applying static analysis to find bugs, therefore, is to reduce the number of bogus warnings while keeping the analysis scalable. However, the accuracy and scalability of most static error detection methods strongly hinges on the precision and efficiency of the underlying pointer analysis, especially for C programs. This makes an accurate as well as scalable pointer analysis desirable for such applications.

For example, without a precise context sensitive alias analysis, it is hard to compute accurate must-aliases for lock pointers that are required to compute locksets for static data race detection. This greatly increases the bogus warning rate thus impacting the utility of such an analysis.

Most of the scalable flow and context sensitive analysis for C programs have been context-insensitive or flow insensitive. B. Steensgaard, in "Points-to Analysis in Almost Linear Time", *POPL*, 1996 (hereinafter Steensgaard), was the first propose a unification based highly scalable flow and context-insensitive pointer analysis. The unification based approach was later extended to give a more accurate one-flow analysis that has one-level of context-sensitivity. The one-flow analysis was intended to bridge the precision gulf between Steensgaard's and Andersen's analysis. Inclusion-based algorithms have been explored to push the scalability limits of alias analysis.

For many applications where flow-sensitivity is not important, context-sensitive but flow-insensitive alias analyses have been explored. There is also substantial prior work on context sensitive flow sensitive alias analysis.

Representing pointer analysis as a logic programming problem allows it to be formulated using sets of datalog rules which can then be used to compute BDDs for a context-sensitive alias analysis with limited flow sensitivity. This approach has been shown to be successful for Java7 where the number of pointers is much lesser as compared to a similar sized C program with less complex aliasing relations.

The classical approach to data race detection involves three steps. The first and most critical step is the automatic discovery of shared variables, i.e., variables which can be accessed by two or more threads. Control locations where these shared variables are read or written determine potential locations for data races to arise. In fact, data races usually arise if a common shared variable is accessed at simultaneously reachable program locations in two different threads where disjoint sets of locks are held.

Since locks are typically accessed via pointers, to determine these locksets at program locations of interest, in the second step a must-pointer alias analysis is carried out. A main drawback of static race detection techniques is that since such techniques work on heavily abstracted versions of the given program the analysis is sound but not guaranteed complete. A consequence is that a lot of bogus warnings may be generated which impacts effectiveness. Key to reducing the false warning rate is the precision of the may-pointer aliasing analysis for shared variable discovery and the must-pointer alias analysis for generating lock aliases needed for computing locksets. Indeed, the most sensitive factor governing the accuracy of a static shared variable discovery routine is the automatic discovery of shared variables. Wrongly labeling a variable as "shared" renders all warnings generated for the variable bogus thereby increasing the false warning rate. On the other hand, if reporting a variable as shared is missed, then generation of warnings fails for a genuine data race involving this variable.

In typical Linux code, for example, data which is global to a thread is usually stored in structures with a large number of fields. Of these, a very small number of the fields are used to store data that is truly shared across different threads with the rest of the fields being used for bookkeeping purposes. Such structures are accessed via pointers. An inaccurate may-alias analysis can produce a large number of aliases for pointers to these global structures thereby resulting in the relevant fields of each of the structures pointed to by the aliases as "global" even if they are accessing a local structure. This may result in a large number of local variables being labeled as shared thereby greatly increasing the false warning rate.

SUMMARY

In fact, in one example in our benchmark suite, a (flow and context-insensitive) Steensgaard Analysis results in an alias set of size 600. Using an Andersen analysis reduced this cluster to size 90. A context sensitive analysis further reduced it to 10 thus underlining the need for an accurate may-alias analysis.

Furthermore, determining the locksets requires an accurate must-alias analysis. A consequence is that these aliases need to be computed both flow and context-sensitively otherwise, a lot of false warnings can be generated. Indeed two control locations in different threads accessing the same shared variable can participate in a data race only if disjoint locksets are held at these locations. If the must-alias analysis is not accurate enough it will result in a subset of the actual must-aliases for each lock pointers resulting in smaller locksets at each control location. Smaller lock sets increase the number of pairs where disjoint locksets are held thus increasing the bogus warning rate.

A key reason for the must-alias to be context-sensitive is that most must-aliases in C arise from parameter passing of pointer arguments in functions, which alias to different pointers in different contexts.

A system and method for pointer analysis for computer program verification includes forming a subset or cluster of pointers from pointers in a program by applying at least two increasingly accurate alias analyses in a cascaded fashion such that each analysis works on a subset of pointers generated by a previous analysis's results. Aliases are computed for any pointer by computing aliases in the subsets instead of an entire program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a sample program showing a may-alias summary computation for an Andersen cluster in accordance with an illustrative embodiment.

DETAILED DESCRIPTION OF PREFERRED EMBODIMENTS

Figure 1:
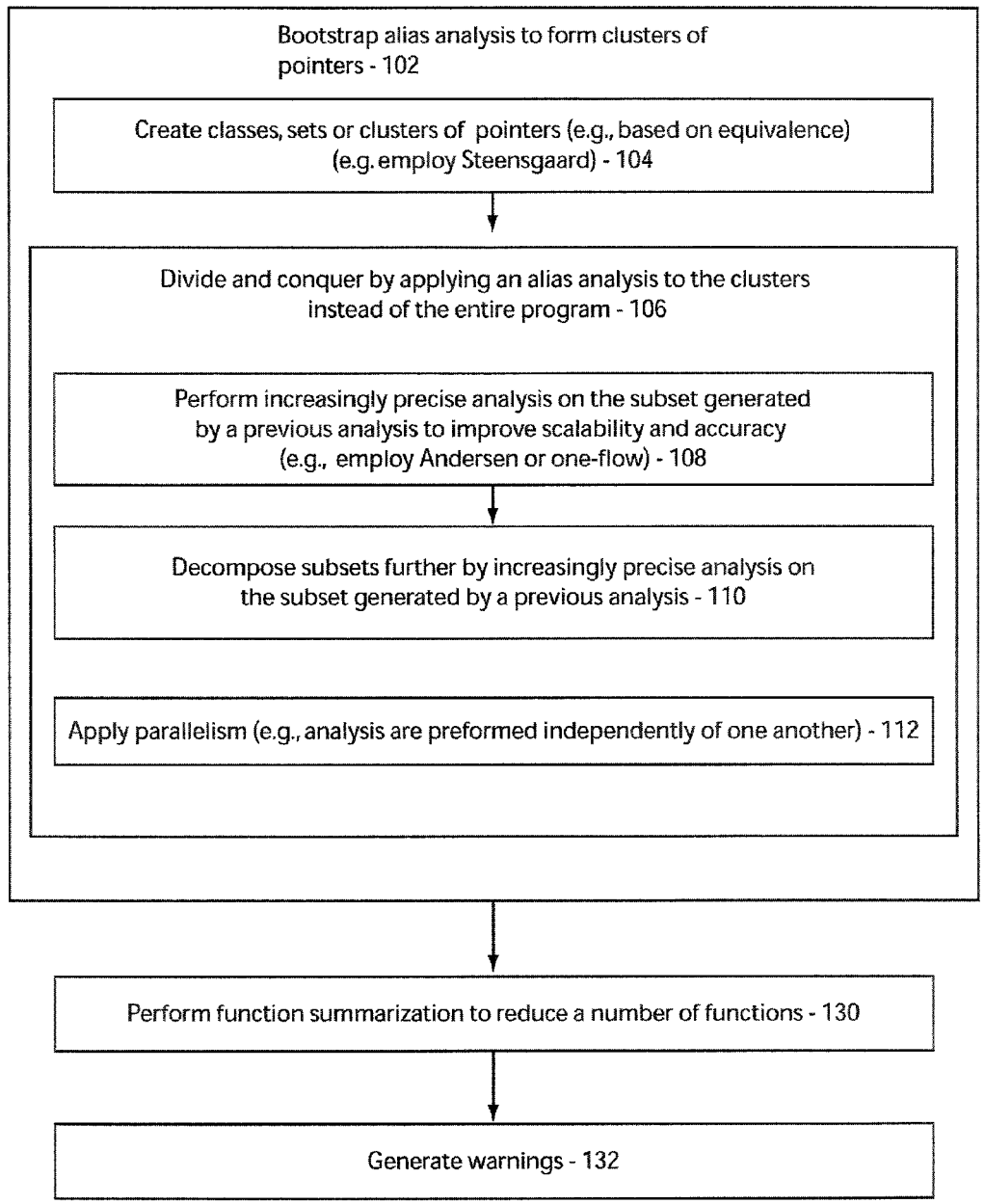
FIG. 1 is a block/flow diagram showing a system/method for pointer analysis used in computer verification in accordance with the present principles.

In accordance with the present principles, a framework for improving both the scalability and accuracy of pointer alias, irrespective of flow or context-sensitivities is provided. In a particularly useful embodiment, this is achieved by leveraging a combination of divide and conquer, parallelization and function summarization.

First, small subsets of pointers are identified such that the problem of computing aliases of any pointer can be reduced to computing the aliases in these small subsets instead of the entire program. To identify these subsets, we first apply a series of increasingly accurate but highly scalable (context and flow-insensitive) alias analyses in a cascaded fashion such that each analysis $A_i$ works on the subsets generated by the previous one $A_{i-1}$. Restricting the application of subsets generated by $A_{i-1}$ instead of the entire program improves its scalability. In other words, $A_i$ is bootstrapped by $A_{i-1}$. Once these small subsets have been computed, to make our overall analysis accurate, we employ a new summarization-based flow and context-sensitive alias analysis. The small size of each subset offsets the higher computational complexity of the context-sensitive analysis.

In the present framework, the analysis for each of the subsets can be carried out independently of others thereby permitting us to leverage parallelization to further improve scalability. One strategy underlying our analysis is to first use an efficient and scalable analysis to identify small subsets of pointers, called clusters, that have the property that the computation of the aliases of a pointer in the given program can be reduced to the computation of its aliases in each of the small subsets in which it appears.

This, in effect, decomposes the pointer analysis problem into much smaller sub-problems where instead of carrying out the pointer analysis for all the pointers in the program, it suffices to carry out separate pointer analyses for each small subset. Once this partitioning has been accomplished a highly accurate pointer analysis can then be leveraged. The small size of each subset then offsets the higher computational complexity of this more precise analysis.

To identify the clusters, we apply a series of increasingly accurate (but less scalable) alias analyses in a cascaded fashion such that each analysis $A_i$ works on the subsets generated by the previous one and not on the entire program. Restricting the application of $A_i$, to subsets generated by $A_{i-1}$, instead of the entire program improves its scalability. In other words, $A_i$ is bootstrapped by $A_{i-1}$. Once these small subsets have been computed, to make our overall analysis accurate, we employ a new summarization-based flow and context-sensitive alias analysis. We start the bootstrapping by applying the highly scalable Steensgaard's analysis to define clusters as sets of pointers aliased as encoded in the Steensgaard points-to graph. Since Steensgaard's analysis is bidirectional, it turns out that these clusters are in fact equivalence classes of pointers.

There exist Steensgaard clusters whose cardinality is too large for a context sensitive alias analysis to be viable (as determined by a threshold size). Andersen's analysis (L. O. Andersen in "Program Analysis and Specialization for the C Programming Language", *PhD. Thesis, DIKU*, 1994 (hereinafter Andersen)) is then performed on these large clusters. Thus, where Andersen's analysis, which is more accurate than Steensgaard's, might have been less scalable on the original program, leveraging Steensgaard's analysis to first partition the set of pointers in the program improves its scalability, e.g., Steensgaard's analysis bootstraps Andersen's analysis.

More generally, bootstrapping permits one to string together a series of analysis of increasing accuracy until the subsets are small enough to ensure scalability of a highly precise alias analysis, context-sensitive or not. This ensures scalability as well as accuracy of the overall analysis. Furthermore, since these clusters can be analyzed independently of each other, it gives us the ability to leverage parallelization.

A new summarization-based approach for flow and context-sensitive alias analysis is herein provided. One bottleneck of context-sensitive alias analysis is that the number of contexts grows exponentially in terms of the number of functions in a given program. Typically, large-scale C programs tend to have a large number of small functions which can easily cause the number of contexts to blow up and overwhelm the analysis. Recently, BDD-based approaches have been proposed that can, in theory, encode exponentially many contexts in a linear-sized data structure. However, the size of a BDD is highly sensitive to the ordering of variables. While Java™ programs with fewer pointers (as compared to a similar sized C program) and simpler aliasing relations are more amenable, it is not hard to construct a small C program to cause a BDD to blow up or spend too much time in variable re-ordering. It is well known that BDDs work well for manipulating relations with up to 200 variables for which variable re-ordering can be carried out effectively. For larger relations their robustness is not guaranteed.

Function summarization offers an effective solution for handling the blow-up in the number of contexts. Indeed, summarization is by its very nature compositional thus making it more robustly scalable to large code. A summarization technique relying on the building of partial transfer functions has been explored for pointer analysis. The key idea in the previous technique was to capture all the different ways in which the points-to relation between the parameters of a function that are pointers can be modified by executing the function body.

The present summarization method is different and relies on capturing sequences of assignments to pointers that are relevant for aliasing. The aliases of a pointer in a given context can then be computed by splicing together assignment sequences for all the functions in the order in which appear in the context. Tracking sequences of assignments locally within each function and splicing them together across functions in the given context makes the present analysis flow-sensitive not just locally inside a function, but for the entire program.

The performance issues in computing summaries is that for programs with a large number of pointers (i) the summary sizes may blow up, and (ii) with a large number of statements modifying pointers, the time needed to compute fixpoints when performing an interprocedural data low analysis may grow. However, such scalability problems can be ameliorated by computing summaries individually for each pointer cluster resulting from the bootstrapping procedure described above.

Our experiments for a broad class of commonly used programs have shown that subset sizes post Steensgaard and Andersen clustering are small with a majority of the subsets (more than 90%) being of size less than 10. There are two consequences of this with respect to summary computation. First, subsets with small cardinality ensure that the resulting summaries will be small. Secondly, the number of statements modifying values of pointers in a given cluster also tend to be few and highly localized to a few functions. This in turn, obviates the need to compute summaries which do not modify any pointers in the given cluster, which accounts for a majority of the functions. In other words, bootstrapping allows us to exploit locality of reference which makes our summary computation approach highly scalable.

The new contributions in accordance with the present principles provide a framework for scalable flow sensitive context sensitive alias analysis that: 1) Ensures both scalability and accuracy via bootstrapping and by exploiting synergies between bootstrapping and summarization; 2) Allows us to leverage parallelization which is important given the increasing prevalence of multi-core architectures; 3) Is flexible: applications of pointer analysis vary widely in terms of accuracy requirements as well as the class of pointer for which the aliasing information is needed. For example, for lockset computation in data race detection, one needs to focus only on clusters including at least one lock pointer. In practice, since lock pointers typically alias only to other lock pointers such subsets are comprised solely of lock pointers. Similarly different compiler optimizations may need analysis for different pointer sets.

Bootstrapping allows us to perform pointer analysis on a need-to basis by focusing only on those clusters which include pointers relevant to a particular application. This drastically reduces the size of the problem. Furthermore, for some applications, we might not need a context sensitive analysis at all and can simply stop at the bootstrapping phase itself. 4) Is field sensitive; and 5) Can handle function pointers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or a semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a pointer analysis framework 100 in accordance with one illustrative embodiment is shown. The pointer analysis framework includes a bootstrapping framework for scalable flow and context-sensitive pointer alias analysis. The key factors that determine scalability of a flow and context-sensitive alias analysis, especially for C programs, includes: 1) The total number of pointers in the given program: typical C programs have a large number of pointers with complex aliasing relations thereby rendering the task of computing accurate flow and context-sensitive aliases a complex one. 2) The number of statements in a given program accessing pointers: C programs typically have a high density of pointer accesses. Scalability of pointer analysis depends both on the number of pointers in the given program as well as the number of statements accessing those pointers. 3) The number of contexts: large-scale real-life programs usually have a large number of small functions resulting in a huge number of contexts. As the program size grows, the number of contexts grows exponentially.

The framework uses a three-pronged strategy to address bottlenecks arising out of the above-mentioned factors. For C programs, scalability issues resulting from a large number of pointers and high pointer access density are ameliorated by employing bootstrapping that essentially involves a novel combination of a divide and conquer strategy with parallelization. The blowup in the number of contexts, on the other hand, is addressed via the use of a new summarization method. We demonstrate that combining (i) bootstrapping, (ii) parallelization, and (iii) summarization results in a powerful framework for scalable flow and context-sensitive pointer alias analysis.

A challenge in pointer analysis is to satisfy the conflicting goals of (i) accuracy and (ii) scalability as well as efficiency. As the accuracy of an alias analysis increases, its scalability falls. In block 102, bootstrapping is performed to achieve both accuracy as well as scalability by applying a series of increasingly precise (but more expensive) pointer analysis on sets of pointers of decreasing size. Towards that end, we first leverage the fact that while, in general, aliasing is not an equivalence relation, many widely used pointer analyses like Steensgaard generate equivalence relations that are over-approximations of aliasing. Indeed, if we define two pointers as aliasing each other if they occur in the same Steensgaard computed points-to set (the same node in the Steensgaard points-to graph) then the resulting relation is in fact an equivalence relation.

Equivalence classes are created for pointers in block 104. We call the resulting equivalence classes Steensgaard Clusters or merely clusters when it is obvious from the context. We show that these clusters have the property that they respect the aliasing relation, i.e., each pointer can only be aliased to a pointer in its cluster. This enables us to then leverage divide and conquer, in block 106, by focusing our alias analysis on each individual cluster instead of the entire set of pointers.

In other words, when analyzing a cluster only those program statements that access pointers in this cluster need be taken into consideration. This now permits us to leverage a more precise alias analysis in block 108. So while this precise analysis might not have been scalable on the original program, it likely becomes more scalable on the new sub-problem as we now need to focus only on the small number of pointers within each class and only on statements of the given program that modify these pointers while skipping the others.

Figure 2:
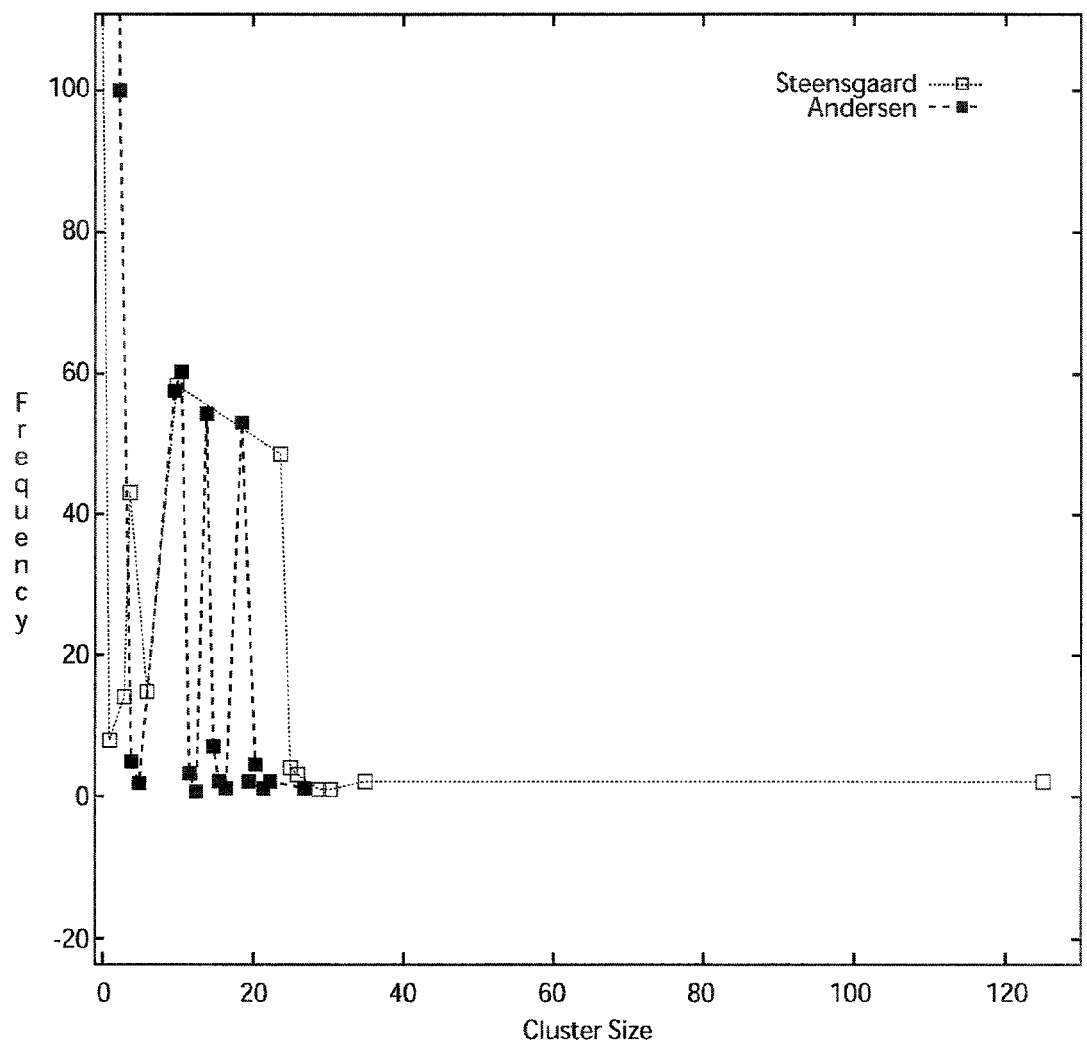
FIG. 2 shows a plot of frequency of each cluster size in a Linux Driver.

In a large-scale real-life program more than 90% of the Steensgaard clusters are of size less than 10 with clusters of higher size occurring with a low frequency. FIG. 2 shows that the plot of frequency of each cluster size in a Linux Driver. This plot, in fact, depicts the scenario across all the examples that we considered. It shows that by simply generating Steensgaard clusters, we can localize the aliasing problem to only the relevant pointers making it possible to efficiently compute precise aliases for most (more than 90%) of the pointers in the program, viz., those belonging to small clusters.

To extend scalability of the analysis to all pointers in the program, one bottleneck is the maximum cluster size. The larger a cluster the more pointers it has, which in turn leads to higher density of accesses as there exist more program statements that modify these pointers. This increases the sizes of the data structures used for tracking the pointers (memory usage) as well as the termination time of the fixpoint computations needed to compute the aliases. Thus, if a Steensgaard cluster is still larger than a threshold value then we need to further define smaller clusters to make a highly precise flow and context-sensitive alias analysis viable. Towards that end, we leverage Andersen's analysis individually on each Steensgaard clusters of large enough cardinality in block 108.

Analogous to a Steensgaard cluster, an Andersen Cluster is defined as a set of all pointers that can point-to (as computed in the Andersen's points-to graph) the same location. We recall that Andersen's analysis is more accurate but less scalable than Steensgaard. However, as noted above, since we are not applying Andersen's analysis directly on the original program but only on pointers within a single Steensgaard cluster, scalability is unlikely to be an issue. Indeed, the maximum Steensgaard cluster size we have seen in our examples is 600 in a program with a total of pointers which clearly demonstrates the reduction in the scale of the problem. An interesting point to note is that whereas Steensgaard clusters are equivalence classes, the aliasing relations induced by points-to sets computed via Andersen's analysis are not equivalence relations. In this case, the same pointer may appear in more than one Andersen cluster. It is guaranteed, however, that each pointer will appear in at least one cluster. Thus, Andersen clusters define a cover rather than a partitioning of the set of pointers in the program.

Unfortunately, Andersen clusters do not respect the aliasing relation as a pointer can be aliased to other pointers in multiple clusters. However, one point is that the set of aliases of a pointer p in a program is the union of the set of aliases of p computed with respect to each of the Andersen Clusters $AC_i$ where only program statements accessing pointers in $AC_i$ are processed. In other words, we can still decompose the aliasing program into smaller sub-problems, in block 110, which was the intended goal. Note that Andersen's points-to analysis, being unidirectional, is more precise than Steensgaard's which is bidirectional, Hence, it produces smaller clusters that cover each Steensgaard partition even when the same pointer may appear in multiple clusters. For instance, the 600 size cluster in the example was broken up into several clusters the maximum size of which was 93. Usually, Andersen clusters are small enough so that we can leverage our new summary based flow and context-sensitive pointer analysis.

There are several observations. Since we can recover the aliases of a pointer in the given program from its aliases in each of the clusters it is contained in, the pointer analysis for each cluster can be carried out independently thereby giving us the ability to parallelize our analysis.

In block 106, progressively applying more accurate but increasingly expensive analyses in a cascading fashion on smaller and smaller sets of pointers amortizes the total cost of the analysis thereby ensuring both efficiency and accuracy of our overall analysis. Note that the initial Steensgaard and Andersen analyses are used merely to divide the aliasing problem into smaller subproblems. Hence, these analyses need not be highly accurate with scalability being the bigger concern at this stage. In the framework 100, to guarantee scalability we chose to use Steensgaard's analysis followed by Andersen's on large Steensgaard clusters instead of the original program. However, we are clearly not restricted to these pointer analyses, and other analyses may be employed. If Andersen's analysis is still intractable on the Steensgaard clusters one can use, for example, the one-flow analysis proposed in M. Das, "Unification-based pointer analysis with directional assignments", in *PLDI,* 2000, which is more scalable than Andersen's and more accurate than Steensgaard's. The one-flow analysis can then be followed by Andersen's Analysis on the One-Flow Clusters, for example.

Leveraging bootstrapping in conjunction with parallelization can be used to increase the scalability of a given pointer analysis. Indeed, one reason why one-flow analysis was developed is the scalability bottleneck of Andersen's analysis. One-flow analysis was proposed as a middle ground between Steensgaard and Andersen in order to address the precision issues in Steensgaard's and limited scalability of Andersen's. However, one-flow analysis is not as accurate as Andersen's though it is more scalable. Bootstrapping permits us to ensure scalability of the more accurate Andersen's analysis to larger programs. Indeed, by first identifying Steensgaard clusters and then leveraging Andersen's analysis on these clusters instead of applying it directly on the original program ensures its scalability for much larger programs. Thus, programs which were previously not amenable to the (accurate) Andersen's now become so. Thus, bootstrapping can be used to increase the scalability of existing pointer analyses.

When the cluster sizes have been significantly reduced, a highly accurate summary-based context-sensitive analysis becomes viable on these clusters. As mentioned above, having clusters with a small number of pointers ensures that very few statements of the given program access these pointers. In fact, since more than 90% of the clusters have cardinality less than 10 the density of program statements that access these pointers will be very low.

In practice for a given small cluster, most functions have no statements accessing pointers in that cluster thus obviating the need to compute summaries for such functions. This reduces summary computation for each cluster to a small number of functions. In fact, most of the clusters are so small that we often merge some of them back together to reduce the overhead of computing summaries for each cluster. Hence, function summarization is performed in block 130. In block 132, warnings may be generated and actions taken to correct inconsistent pointer definitions or other issues or problems with the program and pointers.

Another advantage of bootstrapping is that we can pick and choose which clusters to explore in block 112. Indeed, based on the application, we may not be interested in accurate pointer analysis for all pointers in the program but only a small subset. As an example, for lockset computation used in race detection, we need to compute must-aliases only for lock pointers. Thus, we need to consider only clusters having at least one lock pointer. In fact, since a lock pointer can alias only to another lock pointer, we need to consider clusters comprised solely of lock pointers. This makes the analysis extremely flexible which can be adapted on-the-fly based on the demands on the application. Furthermore, clusters of size 2, which account for a majority of the clusters, can simply not be analyzed further as there is little aliasing information to be gleaned from analyzing a cluster of size two. Moreover, one may choose to engage different pointer analysis methods to analyze different clusters based on their sizes and access densities resulting in a hybrid approach. Thus, bootstrapping makes our framework flexible which can adapted to the need of the target application.

The details pertaining to generation of Steensgaard and Andersen clusters will now be formalized, and a new summary-based approach for computing context-sensitive aliases presented.

Covers: We start by introducing the notion of aliases of a pointer with respect to a set of pointers. Given a set of pointers S and p∈S, the set of aliases of p with respect to S, denoted by Alias(p, S), is the set of aliases of p in a program $P_s$ that results from the given program P by replacing each statement not involving a pointer (including referencing or dereferencing thereof) in S by a skip statement. Let P denote the set of pointers in the given program and Alias(p) the set of aliases of p in P. Obviously, Alias(p)=Alias(p,P). A simple consequence of the above definition is the following: Alias(p, S) ⊂ Alias(p).

Given the set of pointers P of the program under consideration, one goal is to compute subsets $P_1, \ldots, P_m$, of P such that (a) P=$\cup_i P_i$; (b) For each p∈P, Alias(p)=$\cup_i$ Alias(p, $P_i$); (c) The maximum cardinality of $P_i$ over all i is small in order to ensure scalability of computing the sets Alias(p,$P_i$). Note that goal (b) permits us to decompose computation of aliases for each pointer p of the given program to aliases of p with respect to each of the subsets $P_i$ thereby enabling us to leverage divide and conquer. However, to accomplish this decomposition care should be taken in constructing the sets $P_1, \ldots,$ Pn, so as not to miss any aliases. We refer to sets $P_1, \ldots P_m$, satisfying conditions (a) and (b) above as a Disjunctive Alias Cover. Furthermore, if the sets are all pairwise disjoint then they are referred to as a Disjoint Alias Cover.

Computing Disjunctive Disjoint Alias Covers via Steensgaard's Analysis: Steensgaard's analysis can essentially be thought of as a dataflow analysis where only statements that access pointers or reference or dereferences thereof are tracked and aliasing information is maintained as a relation over abstract memory locations. Every location l is associated with a label or set of symbols φ and holds some content α which is an abstract pointer value. Points-to information between abstract pointers is stored as a points-to graph which is a directed graph whose nodes represent equivalence classes of pointers and edges encode the points-to relations. Intuitively, an edge e: $v_1 \rightarrow v_2$ from nodes $v_1$ to $v_2$ represents the fact that a symbol in $v_1$ many point to some symbol in the set represented by $v_2$.

In Steensgaard's analysis, the effect of an assignment from y to x is to equate the contents of the location associated with y with x. This is carried out via unifications of the locations pointed-to by y and x into one unique location and if necessary propagating the unifications to their successors in the points-to graph.

Figure 3:
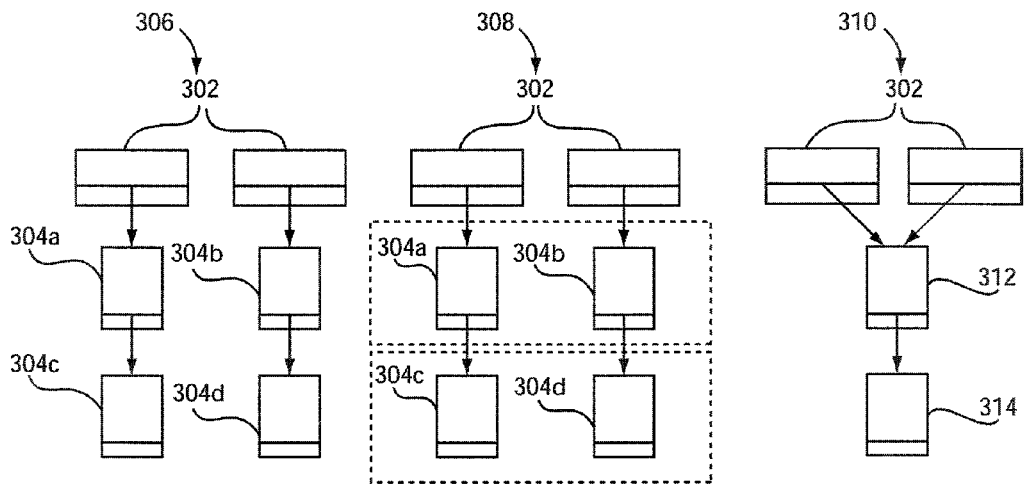
FIG. 3 is a diagram showing three instances where a unification of nodes occurs in a Steensgaard analysis.

Referring to FIG. 3, memory locations 302 have points-to successors 304*a*-*d* in instant 306. In instant 308, successors 304*a*-*d* are identified as able to be unified. In instant 310 successors are unified into nodes 312 and 314.

Since Steensgaard's Analysis does not take into account the directionality of the assignment, it is called bidirectional. Bidirectionality makes it less precise but highly scalable. Formally, the analysis uses type equality rules to merge equivalence classes of symbols at assignments leading to nodes with single out-degree in the points-to graph.

Figure 4:
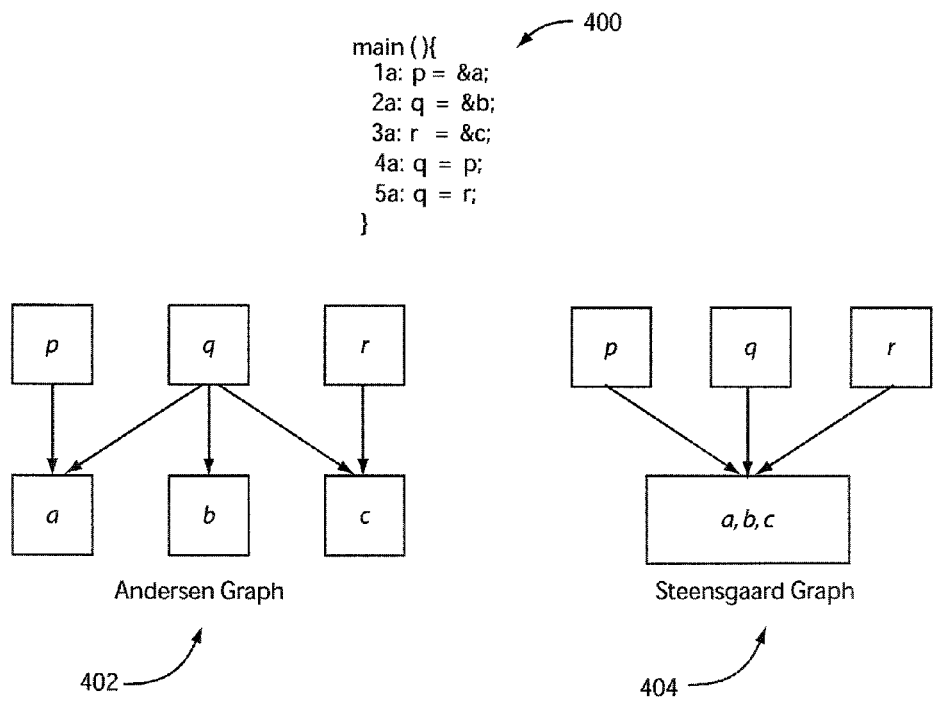
FIG. 4 shows program code and corresponding Andersen and Steensgaard points-to graphs.

Referring to FIG. 4, a program 400 is illustratively shown with its corresponding Andersen points-to graph 402 and Steensgaard points-to graph 404 for an illustrative example. Steensgaard's analysis is extremely efficient because a pointer location can be found and unified in close to constant time. It has a linear space requirement and almost linear running time in the size of the program. A key feature of Steensgaard's Analysis that we are interested in, however, is that points-to sets generated by the analysis are equivalence classes which, therefore, partitions P, the set of all pointers in the program, into disjoint subsets that respect the aliasing relation. A reason for this is that in a Steensgaard points-to graph, each node has an out-degree of at most one. This can be seen as follows: If the node p results from the unification of two different nodes then according to Steensgaard's procedure both the nodes have been unified into one single node. If node p does not result from a unification then p represents a single pointer p that points-to two entities r and t in sets represented by nodes b and c, respectively. Since an entity cannot occur in more than one node r∉$E_c$ and t∉$E_b$. However, since p points to both r and t they should be in the same node leading to a contradiction. Formally, we can show this result via a simple induction on the number of steps in the analysis and showing in the induction step that each of the rules of the type system for Steensgaard's analysis maintain the invariant of at most one out-degree in the points-to graph. Thus we have the following: The points-to sets generated by Steensgaard's Analysis are equivalence classes.

The more interesting part is showing that by restricting an alias analysis to each of the Steensgaard clusters suffices to compute aliases for the entire program. A Complete Update Sequence may be defined as a sequence π of assignments to pointers $p_1=p$, $p_2=p_1$, ... $q=p_k$ is called a complete update sequence from p to q starting at program location l and ending at program location m iff there exists a sequence λ of consecutive program locations $1_1, \ldots, 1_n$ such that (i) l=$1_1$ and m=$1_n$, (i) for each i, there does not exist any assignment to pointer $p_i$, after it is written and before it is read along π, and (ii) p is not modified along the sequence after the assignment $p_i=p$.

We say that a complete update sequence of the form $p_i=$ a, ..., b=$p_m$ is an aliasing sequence between p and q iff p=a and q=b or vice versa.

An easy observation is the following: pointers p and q are alias at control location l if there exists a control location m such that either (i) there exists an aliasing sequence between p and q starting at m and ending at l, or (ii) there exists a pointer "a" such that there exists an aliasing update sequence between p and a and q and a starting at m and ending at l.

We can now get back to our original goal of showing that restricting pointer analysis to Steensgaard clusters does not cause us to miss any alias. Formally, we show the following.

Theorem: Let pointer p belong to the Steensgaard points-to sets $S_{p1}$, $S_{pm}$, then Alias(p)=$\cup$i Alias(p,$S_{pi}$).

Proof: (⊃) It follows easily from the definition of aliases with respect to a set of pointers that Alias(p,$S_{pi}$) ⊂ Alias(p).

(⊂) Let q∈ Alias(p). Then, by the above, p and $\overline{q}$ are aliased at control location l if there exists a control location m such that either (i) there exists an aliasing sequence between p and q starting at m and ending at l, or (ii) there exists a pointer a such that there exist aliasing update sequence between p and a and q and a starting at m and ending at l. We consider case (ii): Let $s_1$=p, $s_k$=a and $t_1$=a, . . . , $t_l$=q be the aliasing sequences starting at m and ending at l. Note that we have considered only one of four cases depending on whether the sequences start at a or q and b or p, the other cases can be handled similarly. Then, the Steensgaard Analysis will execute a unification step for each of the assignments making nodes containing each of the pointers p, a, $s_1$ . . . , $s_k$ point to a unique node in the Steensgaard points-to graph. Similarly, each of the pointers q, b, $t_1$, . . . , $t_l$ also point to a unique node. Since the pointer a appears in both the nodes $n_1$ and $n_2$, they are in fact one and the same node. Thus, p, a, b, q, $s_1$, . . . $s_n$, $t_1$ $t_m$, all belong to the same node and are therefore in the Steensgaard class for p. When computing Alias(p, $A_p$), by definition, neither of the assignments in the two aliasing sequences will be replaced by a skip and hence q∈Alias(p, $A_p$).

The above result shows that Steensgaard clusters form a disjunctive alias cover. In fact, it is a disjoint alias cover. Towards that end, let p be a pointer and let $S_p$ be the cluster containing p. Let q be an alias of p. Then, there exists a common node in the Steensgaard graph which the nodes containing p and q both point to. Thus, there is a point-to set containing both p and q. Since Steensgaard points-to sets are equivalence classes q can occur in only one points-to set which has to be $S_p$. Thus, $S_p$ contains all the aliases of p. In other words, Steensgaard equivalence classes respectively form a disjoint alias cover.

As a corollary, it follows that the pointer analysis problem can be reduced to the Steensgaard classes. It turns out, however, that in some examples the Steensgaard cluster could still be large. In one example from the benchmark suite, the largest Steensgaard Cluster had 600 pointers. Since the size of the largest cluster is the main bottleneck in pointer analysis this needs to be reduced further. For that we leverage Andersen's Analysis.

Leveraging Andersen's Analysis to Compute Alias Covers for Steensgaard Clusters: a large Steensgaard cluster can be broken up into smaller sets that form a disjunctive alias cover for the Steensgaard cluster. Unlike Steensgaard's analysis, the points-to sets generated by Andersen's analysis are not equivalence classes. The reason for this is that Andersen's analysis is unidirectional which permits the Andersen points-to graph to have nodes with out-degree more than one. An example Andersen points-to graph 402 is shown in FIG. 4. Here, the node representing set {q} has out-degree three whereas in the Steensgaard points-to graph 404 shown for the same example each node has out-degree at most one. This happens because in processing the equality q=p we do not merge the nodes p and q as one would do in a bidirectional analysis but make the node for q point to each of the nodes the node for p is pointing to (the points-to set for q can include each of the entities p is pointing to). This introduces the edge from q to a. The edge from q to c occurs due to the processing of q=r.

In an Andersen-generated points-to set, a pointer can appear in more than one cluster therefore, the clusters are not equivalence classes. They do form a Disjunctive Alias Cover. The following result which is similar to that for Steensgaard's analysis and hence its proof is omitted.

Theorem: Let pointer p belong to the Andersen points-to sets $A_{p1}$, . . . then Alias(p)=$\cup_i$ Alias(p,$Ap_i$). Each Steensgaard Cluster is now covered by a set of smaller Andersen Clusters. Indeed consider the example in FIG. 4. The size of the only Steensgaard Cluster {p, q, r} is three. However, this one Steensgaard cluster is broken up into three Andersen Clusters {p, q}, {q} and {q, r}, the maximum size of which is two. In practice, one can obtain drastic reductions in maximum cluster size. For example, the maximum Steensgaard cluster of 600 was reduced to via Andersen's clustering to 93.

Drawbacks of Andersen Clustering and the Resulting Tradeoffs: One potential drawback of Andersen Clustering is that since the clusters are not disjoint they can in some cases have considerable overlap with each other. Thus, a single Steensgaard cluster can in principle produce a large number of Andersen clusters forming a cover. The practical implication is that although the maximum time taken to process each cluster decreases, the total time taken to process all clusters may actually increase. A solution to this problem is to identify an Andersen Threshold such that Andersen clustering is performed only on Steensgaard clusters larger in cardinality than the threshold. While the threshold depends on the implementation, system specifications, among other parameters, one can by experimentation on a benchmark suite representative of the application under consideration come up with such a threshold. For our benchmark suite, it turned out to be, e.g., 200.

SCALABLE CONTEXT SENSITIVE ALIAS ANALYSIS: Exploiting Locality of Reference via Summarization: Using Steensgaard and Andersen clustering, once the pointer aliasing problem has been reduced from the set of all pointers in the program to a small subset, we can leverage locality of reference which then permits an effective employment procedure for summarization for scalable context-sensitive pointer analysis. Indeed, since most of the Andersen clusters are small (less than 10), the density of access of pointers belonging to a single given cluster is usually low. An implication is that the summaries for a given cluster are usually small or even empty for most of functions which can therefore be computed efficiently. In contrast, the BDDBDDB approach, which is known in the art, is monolithic in that it computes aliases for all pointers in all contexts in the given program. As the size of the given program grows the number of contexts grows exponentially and can easily overwhelm such monolithic techniques. While in theory, a linear-sized BDD can potentially capture exponentially many contexts, in practice the size of the BDD is extremely sensitive to the variable ordering. Given any variable ordering it is usually not hard to construct a small program that can lead to a blowup in its size. Indeed, BDDs which were used as a symbolic data structure to encode large state space in model checking have almost been discarded and replaced by SAT-based techniques. Their performance for more than 80-90 variables is undependable. For larger programs most of the time is spent in re-ordering variables to keep the size of the data structure small. Effective re-ordering heuristics have proven to have been hard to develop.

For Java™ programs, which are typically more structured than C programs with simpler aliasing relations, the problem of developing variable re-ordering heuristics is simpler. Indeed, BDDBDDB has shown some success there. However, for C programs, which in general are more 'amorphous' and have more complex aliasing relations than Java programs, it is harder to either give a variable ordering that works for a large enough class of applications or develop variable reordering heuristics. That was borne out by our experiments with Linux Drivers where the technique was overwhelmed by a small KLOC example taking whereas function summarization finished in.

Summarization, on the other hand, has better scalability and performance guarantees. We emphasize that it is the above decomposition that allows us to leverage locality of reference. Indeed, without decomposition we would have to compute summaries for each function with a pointer access, viz., practically every function in the given program. Additionally, for each function we would need to compute the summary for all pointers modified in the function not merely the pointers belonging to the cluster being currently processed which could greatly increase the termination time of the method. By combining divide and conquer with summarization we can exploit the synergy between the two techniques.

Procedure Summaries for Context-Sensitive May-Alias Analysis. We propose a new summarization based technique for demand driven context sensitive pointer analysis. Given a context, e.g., a sequence of function calls, $con=f_1 \ldots f_n$ pointers p and p' are aliased at control location l in con iff there exists a sequence of control locations $\lambda$ leading to l such that either (i) there exists an aliasing sequence between p and q along $\lambda$ (ii) or there exists a pointer a such that there exists an aliasing update sequence between p and a, and q and a along l is a sequence $p_1=p', p_2=p_1, \ldots p=p_m$ during the execution of the functions in con.

By the above, it suffices to compute functions summaries that allow us to construct aliasing sequences on demand. Let A be an Andersen cluster. Then, the summary for a function f with entry location $e_f$ is comprised of the set of all tuples of the form (f,l,p,q), such that there is an aliasing update sequence along a sequence $\lambda$ of control locations starting at $e_f$ and ending at l. To compute the may-alias sequences for pointer p in cluster A at control location l of function $f_n$ in context con, we compute the set $A_n^p$ comprised of pointers q such that there is an aliasing sequence from the entry location of $f_n$ leading to location l, e.g., $(f,l, q, p) \in Sum(f_n)$. Having obtained $A_n^p$, we start traversing backwards along the sequence of functions in con. This involves computing for each pointer $q \in A_n^p$ the set $B_n^q-1$ of all pointers r such that there is an aliasing sequence from r to q along each path starting from the entry location of $f_{n-1}$ to the location where $f_n$ was called. Set $A_{n-1}^p = \cup q \in A_n^p B^q$. Then, repeating the above procedure for each function in con until we reach the root function $f_1$ gives us all pointers q such that there is aliasing sequences from q to p from the entry location of the program to l. A key step, therefore, is to compute summaries that capture the effect of each function on each pointer in A.

Figure 5:
FIG. 5 shows an illustrative program for computing function summarization.

Referring to FIG. 5, a program 500 has two Steensgaard clusters, e.g., $\{g_2, q_2, s\}$ and $\{p_1, g_1, t, r, g_5\}$, and three Andersen clusters, e.g., $\{g_2, q_2, s\}$ and $\{p_1, g_1, t, r\}$ and $\{t, r, g_5\}$. The summaries for the cluster $\{p_1, g_1, t, r\}$ are (foo,l,$g_i$,p) for locations l∈{2a, 3a, 4a}, (bar, 4b, r,$g_1$), (goo, lc, t, r) and (goo, 2c, t, r). Note that in computing the summary for bar, we ignore the statement r=$g_5$ and the tuple (bar, 2b, r, $g_5$) does not belong to the summary.

First, since no pointer is modified in bar, its summary is empty. Also, $g_3 \in Sum(goo,p,2c)$ and $g_4 \in Sum(goo, q, 2c)$. Similarly, $g_4 \in Sum(goo, q, 5c)$ but $g_5 \notin Sum(goo,p,5c)$. This is because the control flow branches at location 3c with p being set to $g_5$ in one branch and retaining the old value $g_3$ in the other. Statically, there is no way of deciding whether $g_3$ and $g_5$ are the same pointer. Thus, Sum(goo,p, 5c)=0. Thus, Sum (foo,p,2a) $\{g_1\}$ and Sum(foo,q,2a)=$\{g_2\}$, whereas Sum(foo, p,3a)=0 and Sum(foo,q,3a)=$\{g_4\}$.

Referring to FIG. 6, an illustrative program flow is provided for May-Alias Summary Computation for an Andersen Cluster in accordance with one exemplary embodiment. Given a pointer p and location l in function f, we perform a backward traversal on a context flow graph (CFG) of a given program starting at l and track aliasing sequences as tuples of the form (m, A), where m is a program location and A is a set of lock pointers q such that there is an aliasing sequence from q to p starting from m and ending at l. The method maintains a set W of tuples that are yet to processed and a set P of tuples already processed. Initially, W includes the tuple (l, {p}) (line 2 in FIG. 6). If the statement at m is of the form r=t, where t∈A, then in processing (m, A), let A' be the set that we get from A by replacing t with r else A'=A (lines 5-7).

To propagate the pointers in A' backwards, there are two cases to consider. First, assume that m is a return site of a function g that was called from within function f. Then, we have to propagate the effect of executing g backwards on each pointer in A'. Towards that end, we first check whether the summary tuples for g have already been computed for each of the pointers in A' for the exit location $exit_g$ of g. If they have, then we form the new tuple (m', B), where m' is the call site of g corresponding to the return site m and $B = \cup_{r \in A} S_{um}(g,r,exit_g)$ (t=r, lines 11-13). If, on the other hand, the summary tuples have not been computed we introduce the new tuple ($exit_g$, A') in the worklist (line 15). For the second case, we assume that, m is not a function call return site. We consider the set Pred of all the predecessor locations of m in f (line 18). For each m' ∈Pred, we form the tuple (m', A'). If tuple (m', A') has already been processed, no action is required. Else, if there already exists a tuple of the form (m', C) in W, then we have discovered a new backward path to location m'. Since we are computing may aliases, i.e., union of aliases discovered along all backwards CFG paths, we replace the tuple (m', C) with the tuple (m', A'∪c) (line 22). If there exists no such tuple, then we simply add the new tuple (m',A') to W.

Function Pointers: Function pointers are handled by performing an Andersen analysis restricted only to Steensgaard clusters of function pointers. Then, a context-sensitive alias analysis is performed as described above but only on the function pointers. For most cases this determines a unique alias for each function pointer. In case there are more than one alias for a function pointer, a call via its dereferencing results in the CFG for each of the functions corresponding the aliases being traversed in the above summary computation.

Arrays and Structures: We flatten all arrays and structures by replacing them with collections of simple scalar variables. This converts are accesses to fields of structures or array elements into regular assignments between standard variables. Thus we get field sensitivity for free.

Having described preferred embodiments of a system and method for scalable flow and context-sensitive pointer alias analysis (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for pointer analysis for computer program verification, comprising:

forming a subset or cluster of pointers from pointers in a program by applying increasingly accurate alias analyses in a cascaded fashion such that each analysis works on a subset of pointers generated by a previous analysis's results; and computing aliases, using a processor, for any pointer by decomposing the subset or cluster of pointers into smaller subsets and computing a separate alias analysis in each of the smaller subsets in parallel instead of carrying out the alias analysis for all pointers in the program.

2. The method as recited in claim 1, wherein forming a subset or cluster of pointers includes dividing pointers into clusters based upon a property that a computation of the aliases of a pointer in the program can be reduced to the computation of its aliases in each of the subsets in which pointer appears.

3. The method as recited in claim 1, wherein applying increasingly accurate alias analyses includes applying Steensgaard's analysis to define clusters as sets of pointers aliased as encoded in a Steensgaard points-to graph.

4. The method as recited in claim 3, wherein applying increasingly accurate alias analyses includes applying Andersen's analysis to the defined clusters from the Steensgaard's analysis.

5. The method as recited in claim 1, wherein computing context-sensitive aliases includes performing a summarization-based flow and context-sensitive alias analysis for each small cluster from Steensgaard and/or Andersen clustering in parallel.

6. The method as recited in claim 1, wherein computing aliases includes computing function summaries for a reduced number of functions.

7. The method as recited in claim 1, wherein function summaries for context and flow-sensitive alias analysis are computed in a top-down manner on a points-to hierarchy to reduce a size of summary tuples.

8. A non-transitory computer readable storage medium for pointer analysis for computer program verification comprising a computer readable program, wherein the computer readable program when executed on a computer causes the computer to perform the steps of:

forming a subset or cluster of pointers from pointers in a program by applying increasingly accurate alias analyses in a cascaded fashion such that each analysis works on a subset of pointers generated by a previous analysis's results; and computing aliases for any pointer by decomposing the subset or cluster of pointers into smaller subsets and computing a separate alias analysis in each of the smaller subsets in parallel instead of carrying out the alias analysis for all pointers in the program.

9. The non-transitory computer readable storage medium as recited in claim 8, wherein forming a subset or cluster of pointers includes dividing pointers into clusters based upon a property that a computation of the aliases of a pointer in the program can be reduced to the computation of its aliases in each of the subsets in which pointer appears.

10. The non-transitory computer readable storage medium as recited in claim 9, wherein computing context-sensitive aliases includes performing a summarization-based flow and context-sensitive alias analysis for each small cluster from Steensgaard and/or Andersen clustering in parallel.

11. The non-transitory computer readable storage medium as recited in claim 9, wherein computing aliases includes computing function summaries for a reduced number of functions.

12. The non-transitory computer readable storage medium as recited in claim 9, wherein function summaries for context and flow-sensitive alias analysis are computed in a top-down manner on a points-to hierarchy to reduce a size of summary tuples.

13. The non-transitory computer readable storage medium as recited in claim 9, wherein applying increasingly accurate alias analyses includes applying Steensgaard's analysis to define clusters as sets of pointers aliased as encoded in a Steensgaard points-to graph.

14. The non-transitory computer readable storage medium as recited in claim 13, wherein applying increasingly accurate alias analyses includes applying Andersen's analysis to the defined clusters from the Steensgaard's analysis.

* * * * *